Aug. 29, 1933. T. BEASLEY 1,924,634
VALVE FOR INFLATION PURPOSES
Filed Feb. 10, 1933
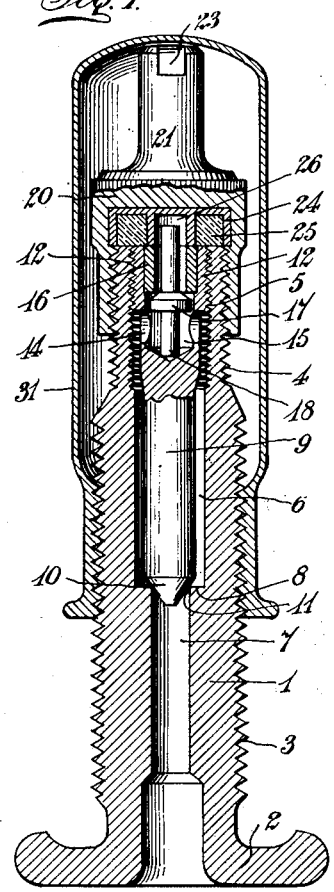
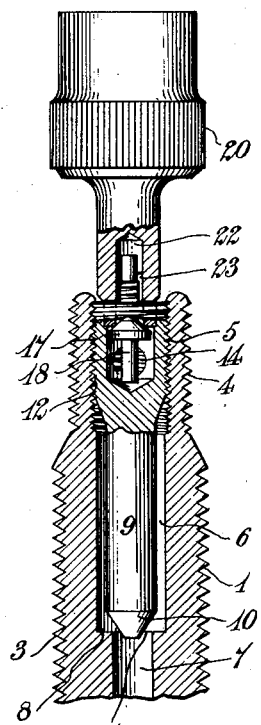
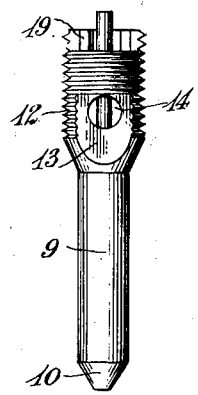
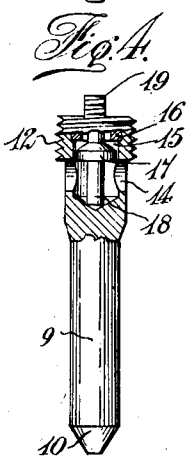
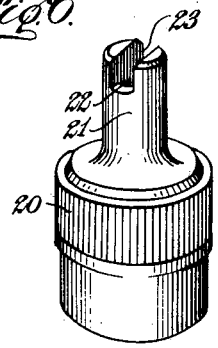
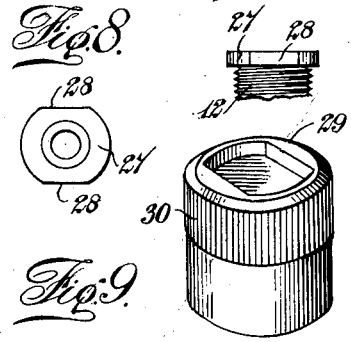
INVENTOR
Thomas Beasley
BY
ATTORNEY Patented Aug. 29, 1933

1,924,634

UNITED STATES PATENT OFFICE 1,924,634

VALVE FOR INFLATION PURPOSES

Thomas Beasley, London, England

Application February 10, 1933, Serial No. 656,174, and in Great Britain May 4, 1931

1 Claim. (Cl. 152—12)

This invention relates to improvements in valves for inflation purposes.

The chief object of this invention is to provide a valve fitment of improved construction which can be screwed into the body of the usual fitting without alteration to the said fitting or into a body shaped to receive the said fitment. The body may have the usual means for attachment to the inner tubes of tires or for attachment to air cushions or inflatable swimming belts or the like.

According to the present invention the improved fitment adapted to screw into a valve body comprises a longitudinal rod member formed with a cone at one end and having a threaded enlargement at the other end, said threaded enlargement having transverse and longitudinal bores, the latter being fitted with a spindle formed or provided intermediately with a disc adapted to seat on the lower end of a sleeve fitted in the said longitudinal bore, said enlargement being formed or provided with means whereby the fitment may be rotated, the arrangement being such as to provide a valve which will permit of exceptional ease of inflation and which can be readily manipulated to prevent leakage or to test pressure.

The invention will now be described with reference to the accompanying drawing, in which:—

Figure 1 is a longitudinal sectional view of one form of valve constructed according to this invention showing the main valve closed;

Figure 2 is a similar view showing the main valve open;

Figure 3 is an elevation of the valve member or fitment;

Figure 4 is an elevation thereof partly in section;

Figure 5 is a plan view of one form of head of the valve member shown in Figure 4;

Figure 6 is a perspective view of the closing cap having means for manipulating the fitment;

Figure 7 is a detail of a modified form of head for the fitment;

Figure 8 is a plan thereof, and

Figure 9 is a perspective view of a modified form of closing cap.

As shown, the improved fitment is adapted to screw into a body or jacket 1 of a valve, which is fitted at its end with any convenient means for securing the body of the valve to the inner tubing. The body 1 may be the usual body of a motor or cycle tire valve. The said securing means usually comprise a lower enlargement 2 and an adjustable upturned flanged member adapted to grip the inner tube therebetween and locking means comprising a flange enlargement adapted to be secured on the rim of the wheel by a nut on a thread 3 provided on the body 1 of the valve. The upper end valve body 1 which is of reduced diameter and threaded at 4 is also threaded interiorly at 5 for a short distance and then formed with a bore 6 of any convenient diameter for about half the length of the body 1. The adjacent portion or the rest of the body is formed with a smaller bore 7, thus an annular shoulder 8 is provided about midway of the valve body 1. This annular shoulder 8 is utilized to form a seating for the improved fitment shown in detail in Figures 3 and 4. The fitment comprises a rod 9 of a suitable length formed with a conical end 10 which is normally adapted to seat in an aperture 11 formed by the two bores 6 and 7 providing the seating 8. The upper end of this rod 9 is enlarged in diameter and threaded at 12 so as to screw into the interior threaded portion 5 of the valve body 1. This threaded enlargement 12 of the rod 9 is formed with opposite flats 13 so that a portion of the threaded enlargement will be of a width substantially equal to the diameter of the rod-like extension 9. A transverse hole 14 is drilled through the flats 13 and a longitudinal bore 15 is drilled from the threaded end of the fitment down to or slightly below the transverse hole 14. In a slightly enlarged portion of this longitudinal bore 15 is positioned a sleeve 16, the lower end of which is adapted to rest on the abutment formed by the two diameters of the bore 15. This lower end of the sleeve 16 is adapted to provide a seating for a flat valve or disc 17 formed or provided on a spindle 18 movably mounted in the longitudinal bore 15. The contacting face of the disc 17 is preferably curved or coned as shown to provide an efficient closure. Obviously the sleeve 16 must be positioned and secured within the bore 15 after this valve which may be termed a needle valve is placed therein. The spindle 18 is loose in the bore 15 and the lower end of the spindle 18 or needle contacts with the transverse bore 14 or with the base of the bore 15 when there is no air pressure in the tire. When the tire is pumped up the valve 17 acts as a non-return valve or back pressure valve against the lower end of the sleeve 16. The upper end or screwed portion 12 of the rod-like fitment 9 is formed with means whereby the fitment may be rotated to move the conical end 10 off its seating 8 or to position the conical end 10 thereon. Such means are preferably in the form of a pair of lugs or projections 19 to co-operate with a key or the like formed on a cap 20 which is adapted to screw on to the nipple end 4 of the valve body 1. The lugs or projections 19 are formed by cutting away opposite sides of the threaded enlargement 12 and the sleeve 16 as shown more particularly in Figures 3, 4 and 5. The outer end 21 of the cap 20 is reduced to a diameter less than the interior thread 5 of the bore 6 and is recessed at 22 and formed with a slot 23 to receive the lugs or projections 19 so that when the cap 20 is unscrewed off the valve body and turned over and placed on the said lugs or projections 19 the fitment 9 can be rotated by means of the cap to open or close the lower valve. The recess 22 in the extension 21 of the cap 20 is of such depth that it will receive the projecting end of the stem 18 of the needle valve. The exterior of the cap 20 is milled or otherwise knurled for manipulation purposes. In the interior of the cap 20 is sprung or otherwise fitted a washer holding member 24. This member 24 in the form of an auxiliary cap is shaped to retain an annular washer 25 to engage on the end of the valve body and the interior of the member 24 is bored or shaped with a recess 26 to receive the upper end of the needle valve stem 18.

If desired, the means whereby the fitment 9 may be rotated may comprise a transverse slot to receive a suitable key, or the threaded enlargement 12 may be further enlarged to provide a head for the transverse slot, the said head being of a diameter slightly less than the screwed end 4 of the valve body 1 which forms the nipple for the usual pump connection. Alternatively, and as shown in Figures 7 and 8, an enlarged head 27 on the end of the fitment may be formed with a pair of oppositely arranged flats 28. The enlarged head 27 formed with the oppositely arranged flats 28 is shaped and adapted to co-operate with recess 29 in the end of a cap 30 which is adapted to screw on to the nipple end 4 of the valve body 1 as will be understood. The interior of the cap 30 may be fitted with a washer to contact with the enlarged head 27 when the said cap is screwed on to the nipple extension 4 of the body 1. The improved fitment may be fitted into any usual type of valve body which may have its bore slightly enlarged so as to leave as much space as possible between the rod and the bore of the body or the rod may be reduced in diameter for a certain portion of its length.

In operation and when it is desired to pump up the tire and referring more particularly to the first construction described, the cap 20 is unscrewed off the nipple end 4 of the body 1 and inverted so that the slot 23 therein co-operates with the lugs 19 of the fitment as shown in Figure 2. The cap 20 is given, for instance, one complete rotation to withdraw the conical end 10 off the lower valve seating 8. The usual pump connection is then screwed on to the nipple end 4 of the valve body 1 and the tire is pumped up in the usual manner, the valve 17 operating as will be well understood to prevent exit of air. In order to test the pressure of air in the tire the flexible connection of the pump is unscrewed and a testing device of any usual or convenient construction is applied to the needle 18 to depress the back pressure or non-return valve 17. When the desired pressure is obtained the cap 20 is again used to rotate the fitment 9 and to place the conical end 10 on its seating 8 and close the lower valve. The lower valve seating 8 will preferably have a knife edge to receive the conical end 10 and there will be a metal to metal connection which will positively seal the valve. In the event of any leakage the back pressure or non-return needle valve 17 will effect a further seal and when the cap 20 is screwed on, if a washer 25 is arranged therein, further sealing will take place. If desired, a dust cover 31 may be screwed on to the body 1 of the valve in the usual manner.

Although the invention is described in connection with motor tire valves it will be understood that the fitment may be screwed into cycle tire valves or valves for other inflation purposes, such as those employed for air cushions or other inflatable articles. In the latter cases the body 1 of the valve will be suitably modified for connection with, for instance, a tubular stem or the like fitted to the inflatable article.

It is preferable to form the whole valve of metal but when used for light pressures other material may be used, such as ebonite.

It will be seen that no springs or resilient washers, are employed in connection with the improved valve, with the possible exception of a washer in the cap, but no springs or washers are used in connection with the two valves in the valve body.

What I claim is:—

A pitman for cooperation with the valve body of an inflation valve comprising a rod-like member formed at one end as a valve element, the member being formed at the opposite end with a longitudinally ranging bore and with a transverse communicating bore opening through the side of the member, the longitudinal bore being formed above the transverse bore with a valve seat, and a valve operating in the longitudinal bore and cooperating with said seat, the valve closing against pressure through the transverse bore into the longitudinal bore and opening against opposite pressure, the bottom of the longitudinal bore serving as a limit for the opening movement of the valve.

THOMAS BEASLEY.